Nov. 28, 1967  L. A. AMTSBERG ETAL  3,354,754
NUT-RUNNER WITH REVERSE ROTATION BRAKE
Filed Nov. 16, 1965  3 Sheets-Sheet 1
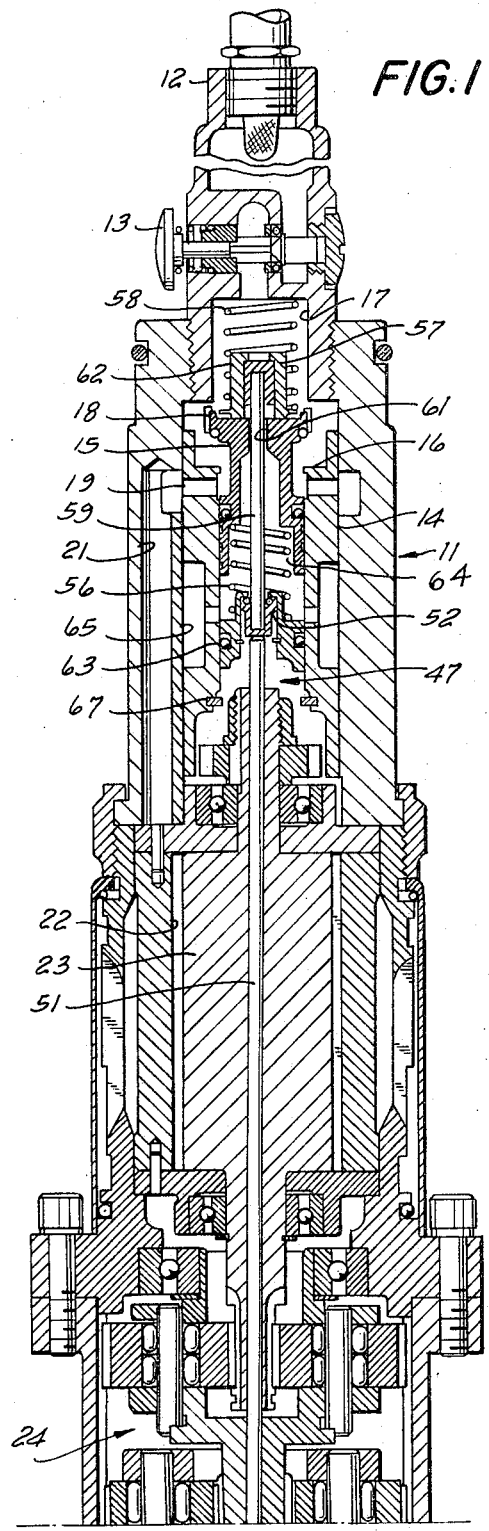
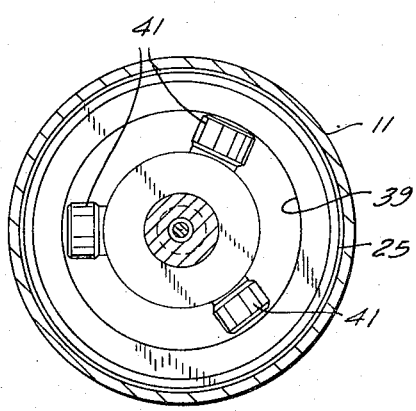
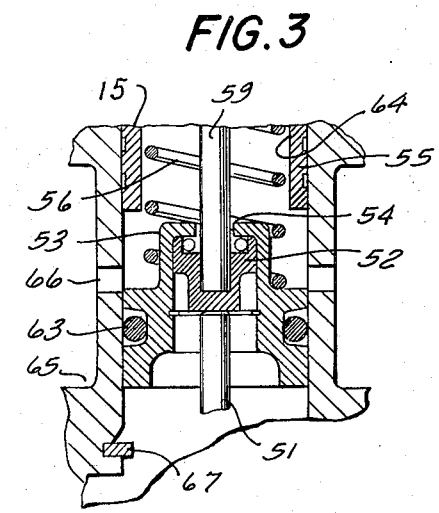
INVENTORS
LESTER A. AMTSBERG
WILLIAM K. WALLACE
BY
Stephen J. Rudy
ATTORNEY Nov. 28, 1967   L. A. AMTSBERG ETAL   3,354,754
NUT-RUNNER WITH REVERSE ROTATION BRAKE
Filed Nov. 16, 1965   3 Sheets-Sheet 2
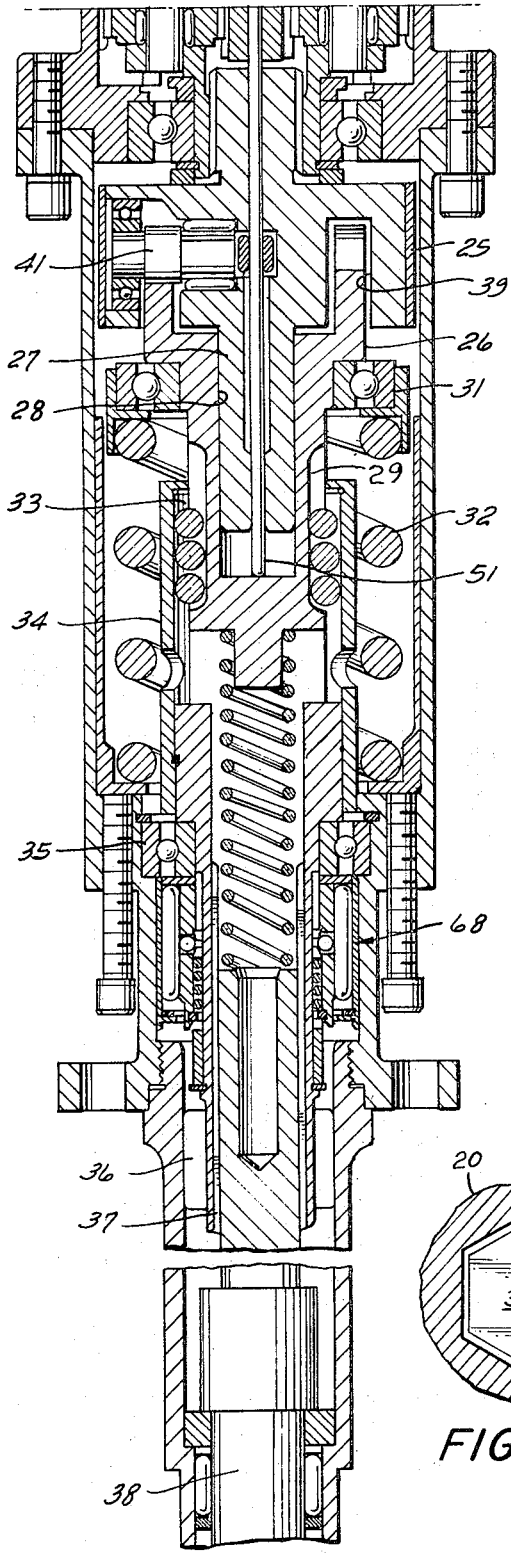
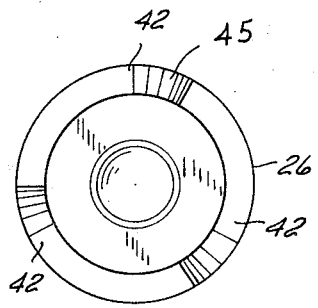
FIG.1a
FIG.5
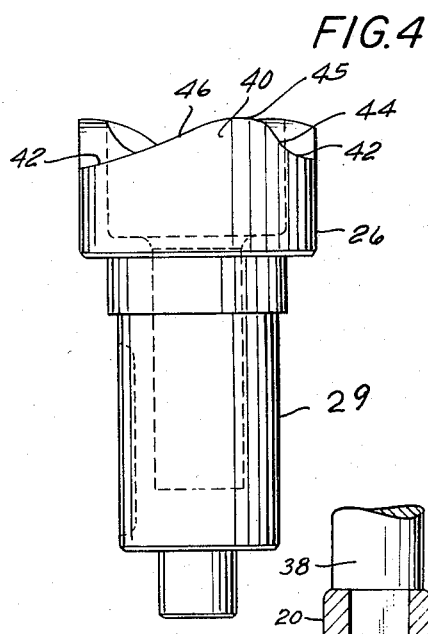
FIG.4
FIG.1b
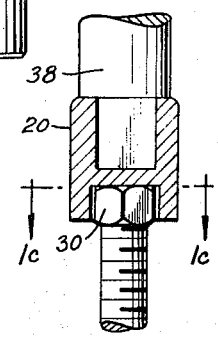
FIG.1c
INVENTORS
LESTER A. AMTSBERG
WILLIAM K. WALLACE
BY
Stephen J. Rudy
ATTORNEY

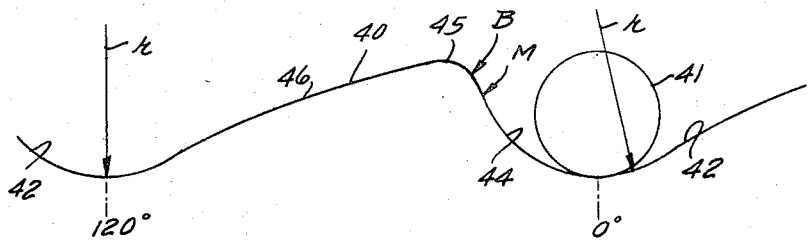
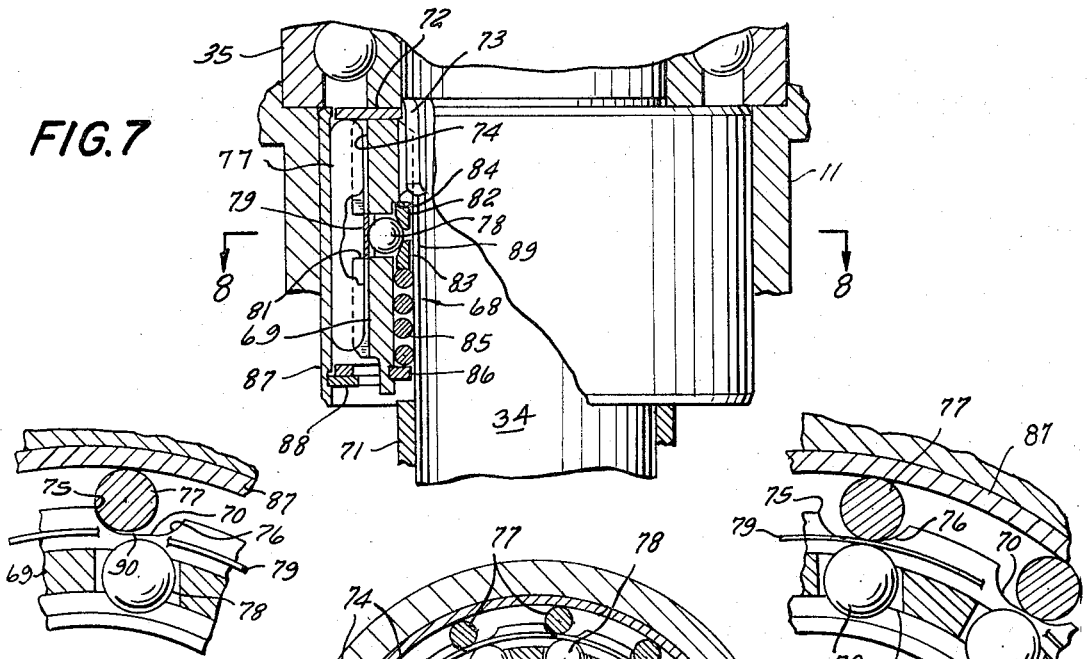
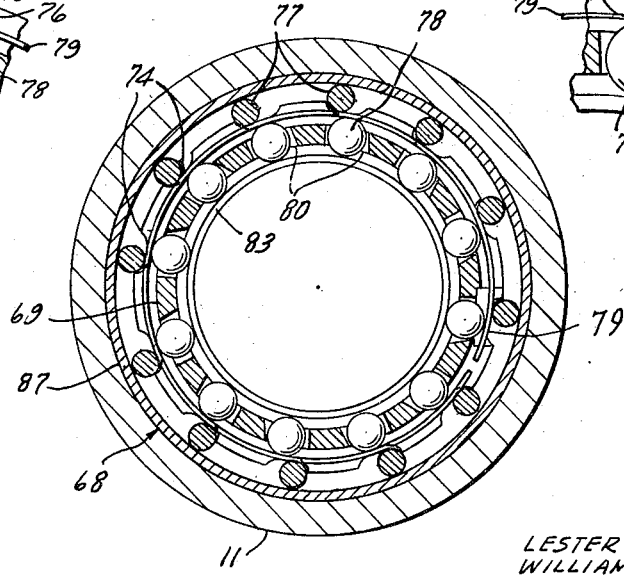

United States Patent Office 3,354,754
Patented Nov. 28, 1967

3,354,754
NUT-RUNNER WITH REVERSE ROTATION BRAKE
Lester A. Amtsberg, Utica, and William K. Wallace, Barneveld, N.Y., assignors to Chicago Pneumatic Tool Company, New York, N.Y., a corporation of New Jersey
Filed Nov. 16, 1965, Ser. No. 508,049
9 Claims. (Cl. 81—52.4)

ABSTRACT OF THE DISCLOSURE

A nut-runner having a torque releasable cam clutch in which a driven member is cammable axially against a return spring relative to a driving member as the latter overrides the driven member under overload. In the overriding action, the spring returns the driven clutch member to engaged condition causing in the process reverse rotation of the output spindle tending to loosen the work. A brake, associated with the spindle and operable in response to a limited degree of reverse rotation of the spindle, brakes the spindle against further reverse rotation. The braking action is automatically releasable following re-engagement of the clutch and resumption of positive rotation of the spindle.

---

This application is directed to a variation from the tool of our co-pending application for an Automatic Recycling Nut Runner, Ser. No. 446,315, filed Apr. 7, 1965, now Patent No. 3,322,205.

In our co-pending application a torque responsive cam clutch functions to transmit the rotary power of an air motor to an output spindle. Upon maximum torque being attained a driving member of the clutch rides out of the cam pockets of a driven member onto adjacent cam lobes causing automatic closing of a valve controlling operating air flow to the motor. The driving clutch member comes to a halt upon the cam lobes before it can override the crests of the lobes. Momentarily after the latter action a clutch spring acts through the driven clutch member to reversely rotate the driving clutch member back into the pockets to reengaged condition. Then, following a short time delay operating air flow to the motor is resumed as the control valve is automatically caused to re-open.

In the form of the invention in this application the cam lobes of the driven clutch member are designed so that, following attainment of maximum torque and stoppage of operating air to the motor, the driving clutch member will under residual energy of the motor ride over the cam crests. Consequent upon this action re-engagement of the driven clutch member with the driving clutch member occurs under the force of the return spring.

A general object of this invention is to permit in a tool of this nature the driving clutch member to ride over the crests of the driven clutch member following attainment of maximum torque and stoppage of operating power to the motor, and to allow the driven clutch member under the force of its return spring to re-engage with the driving clutch member without transmitting through the output spindle and work socket a negative torque tending to loosen the work.

A further object is to permit in this re-engaging action a slight negative rotation to be transmitted to the output spindle.

A particular feature of the invention is a one-way clutch whereby the extent of negative torque transmitted in the clutch re-engaging action is controlled.

In the accompanying drawings:

FIGS. 1 and 1a are continuations of one another in longitudinal section; FIG. 1 represents the upper half of a nut running tool embodying the invention; and 1a represents the lower half;

FIG. 1b is a fragmentary detail of the terminal end of the output spindle showing the socket engaged with the work;

FIG. 1c is an enlarged section on line 1c—1c of FIG. 1b intended to show the slack relation of the socket with the work;

FIG. 2 is a detail of the bottom face of the driving clutch member;

FIG. 3 is an enlarged detail of the arrangement of the pilot valve and associated elements;

FIG. 4 is a detail in elevation of the driven clutch member;

FIG. 5 is a detail of the upper face of the driven clutch member;

FIG. 6 is a development view of a cam lobe of the driven clutch member;

FIG. 7 is a detail of the one-way clutch and associated elements;

FIG. 8 is a section taken on line 8—8 of FIG. 7;

FIG. 9 is a fragmentary view of the one-way clutch in braking condition; and

FIG. 10 is a fragmentary enlarged view showing the one-way clutch in free condition.

The nut runner in the accompanying drawings embodying the present invention includes an elongated housing 11 having an inlet fitting 12 connectable to a source of pressure air. Operating air to the tool is supplied through a manually operable valve 13 of the inlet fitting. The valve fitting 12 may be replaced with a monitoring switch, such as that shown in our co-pending application, to facilitate use of the tool in multiple nut running applications.

Fixed in the housing is an open-ended valve block 14 in which an air control valve 15 is slidable relative to a valve seat 16. This valve has a normally open condition permitting operating air entering an inlet chamber 17 to flow around a head 18 of the valve through the opening of the valve seat to radial ports 19 of the valve block, and then through passage means 21 to a chamber 22 to drive a conventional air motor 23 of the radially slidable blade type. Rotation of the motor is transmitted through a double stage of reduction gearing 24 to a driving upper clutch member 25 of a torque releasable cam clutch. The upper clutch member is restrained against axial movement, and has a torque releasable driving connection with an axially movable lower driven clutch member 26. When maximum torque is attained, the upper clutch member over-rides and cams the lower clutch member axially out of engagement. The lower clutch member is guided in this axial movement by means of a shaft portion 27 of the upper member depending in a bore 28 provided in a depending stem 29 of the lower member. The lower clutch member is journaled in a bearing 31 carried by a heavy clutch spring 32. This spring normally holds the lower clutch member engaged with the upper member.

The stem 29 of the lower clutch member has an axially slidable ball spline connection 33 with an open ended intermediate output spindle 34. The latter is journaled in bearing elements 35 and 36, and is restrained by the bearings against relative axial movement. Spindle 34 has an internal splined driving connection 37 with a terminal output spindle 38. The latter is fitted at its external end as shown in FIGS. 1b and 1c, with a conventional work socket 20 (FIG. 1b) which is engageable with a threaded fastener, such as a nut, or the head 30 of a bolt. A limited degree of slack or looseness, as indicated at 30a in FIG. 1c, normally exists between the work and the socket. The work is gripped in normal manner by the socket for transmission of torque to it following a slight rotation of the socket relative to the work to take up this slack.

Journaled for rotation in an annular channel 30 (FIGS. 1a, 2) opening out of the underside of a body portion of the upper clutch member are three rollers 41 spaced 120 degrees apart. The upper clutch member has clutchable engagement with the lower member by means of the rollers. The rollers are normally engaged in pockets or troughs 42 (FIGS. 4–6) formed in an opposed annular end wall of the lower clutch member. The troughs are three in number, spaced equally apart; and each is connected to the next by a separate cam lobe 40. Each trough has a curvature of an inside radius $r$, the magnitude of which is considerably greater than the radius of the roller seated therein. Each cam lobe is defined, as best seen in FIG. 6, by a short forward slope 44 extending from the bottom of one trough to the top of a rounded crest 45, and by a long back slope 46 extending from the top of the crest down to the bottom of the next trough. The elevation of the crest of a lobe relative to the bottom of a trough is slightly less than the radius of the trough. In this arrangement, the rollers are adapted to ride over the crests of the cam lobes from one trough to the next upon a predetermined torque being attained and after power to the motor has been shut off.

During the time the clutch is engaged and running down a free-running fastener, the rollers 41 are seated substantially at the bottoms of the troughs (FIG. 6). As the tightness of the work and its resistance to rotation increases, the rollers ride forwardly over the troughs toward the high ends thereof increasing torque delivery as they do so. Maximum torque delivery is attained as the rollers reach the points of tangency M where the inside radius of each trough changes over to the small outside radius of the crest 45. At this point the work will have been driven to a predetermined degree of tightness, whereupon the resistance of the work causes the upper clutch member to release its driving relation to the driven member as it carries the rollers beyond the points M and over the crests of the cam lobes.

As the rollers ride over the bottoms of the troughs toward the high points M, they progressively cam the driven clutch member 26 axially downward against the resistance of the yieldable heavy clutch spring 32. In response to this axial movement of the lower clutch member, control means, generally indicated at 47, automatically functions to cause closing of the control valve 15 and consequent interruption of operating air to the motor at about the time the rollers have climbed beyond the points M to the points B close to the cam crests. The motor, however, does not abruptly stop following shut off of the power, but is carried about by its residual energy for a few revolutions which, because of the form of the cam lobes, is sufficient to carry the rollers over the cam crests onto the back slopes 46.

The means 47 for automatically shutting off operating air to the motor is substantially similar to that disclosed in our co-pending application, but is slightly modified in degree so as to delay the actual shutting off of air flow until the rollers have moved beyond the points M and reached close to the crests of the cam lobes. This delay insures that there will be sufficient residual energy in the motor to carry the rollers over the crests. Briefly, this air control means includes a long slide rod 51 seated axially of the driven clutch member and extending beyond the motor into the interior of the control valve block 14. Seated atop the rod is a pilot valve 52 (FIGS. 1 and 3) which is slidable interiorly of a valve case 53 relative to an orifice 54 formed in a top wall of the valve case. The valve case in turn is slidable interiorly of the valve block 14 relative to the pilot valve. Slidable in the valve block above the valve case is a depending hollow piston portion 55 of the control valve 15. The tension of a valve opening spring 56 limited between opposed shoulders of the control valve 15 and the valve case 53 normally presses the valve case downward so that its top wall is seated upon the pilot valve and the latter seals over the orifice 54; and the spring 56 also presses the control valve 15 upwardly so that its valve head 18 is elevated in open condition, as in FIG. 1. The head 18 of the control valve normally abuts against a spring retainer cup 57 against which presses a valve closing spring 58 of greater strength than the valve opening spring. The closing spring is, however, normally disabled by means of a short slide rod 59 from closing the control valve. This rod is seated axially of the pilot cup, passes with clearance through the orifice 54 of the valve case, extends with clearance through a port 61 in the control valve head, and carries a cap 62 at its upper end. Upon this cap the spring retainer cup 57 is pressed by the closing spring 58. The normally closed pilot valve 52 as well as a seal 63 about the valve case normally seal escape of air from a chamber defined by the combined hollow interior 64 of the control valve and an isolated annular chamber 65 connected to it by radial ports 66.

With respect to the manner of operation of the air control means: as the lower clutch member moves axially downward relative to the upper clutch member, the control rods 59, 51, the retainer cup 57, control valve 15, the pilot valve 52 and valve case 53 all follow its movement as a unit under the expanding force of the closing spring 58. At about the time the rollers reach the maximum torque delivery points M, the valve case 53 will have limited in its downward movement against a stop ring 67. The pilot valve 52 will not, however, have opened at this time, and the control valve 15 will still be short of its seat. Next, as the rollers climb up the short slopes 44 beyond the points M, the pilot valve will be forced slightly further down to open condition relative to the valve case, permitting air trapped in the interior 64 of the control valve and in the isolated chamber 65 to vent through the orifice 54 of the valve case and passage means, not shown, connected with the rotor chamber 22. At about the same time as the pilot valve opens, the control valve 15 closes upon its seat to shut off air flow to the motor. This occurs just before the rollers reach the crests of the cam lobes at about the points B. However, residual rotation of the motor before it actually stops is sufficient to carry the rollers over the crests 45 onto the back slopes 46 of the cam lobes. As this occurs the heavy clutch spring 32 acts to return the driven clutch member to engaged condition. In this latter action, the control rods 51, 59 are moved upwardly against the resistance of the closing spring 58, whereby the spring retainer cup 57 is elevated from the control valve head 18 clear of the port 61 to allow inlet air to bleed into the chambers 64, 65; and the pilot valve is raised to seated condition over the port 54 of the valve case whereby the air bleeding into the chambers 64, 65 is blocked against escape. The control valve 15, however, remains closed under pressure of overhead air relatively greater than the force of the opening spring 56 for a short time until the rollers have just about settled in the next troughs. Then, as the air pressure in chambers 64, 65 counterbalances that acting over the head 18 of the control valve, the opening spring 56 acts to re-open the control valve, allowing entry of operating air to re-cycle the motor. This cycling disengagement, momentary delay, and re-cycling process continues until the air entry valve 13 is shut off by the operator, or until the main air supply is automatically shut off, as by the switch control means described in our co-pending application.

In the restoring action of the lower clutch member to engaged condition under the return action of the heavy clutch spring, the back slopes 46 of the cam lobes cooperate with the rollers 41 to force the rollers down the slopes into the next troughs and to impart a negative degree of rotation to the driven clutch member. A one-way clutch 68 (FIGS. 1a, 7–10) is provided to effect a braking action on the reverse rotation of the driven clutch member so that this negtaive torque will not be transmitted back through the output spindle 38 and the slack normally existing in the work socket to impart an undesirable loosening impact to the work.

The one-way clutch includes an annular body member 69 disposed in surrounding relation to the intermediate spindle 34 between a spacer 71 carried by the spindle and a washer 72 limitable against the overhead bearing 35. The intermediate spindle 34 has a driving spline connection 73 with an internal upper portion of the clutch body. Formed about the periphery of the clutch body in equally spaced relation to one another is a plurality of longitudinal grooves 74. Each is defined by a pair of spaced opposed arcuate shoulders 75, 76 connected to one another by a bottom wall portion 70. Shoulder 75 is of greater radial depth than the other; and the bottom wall 70 is inclined from the shoulder 75 toward the shoulder 76, as best appears in FIG. 10. Disposed in each groove is an elongated roller 77 which is adapted to roll over the bottom of the groove. Registering with the mid-area of each groove is a separate radial opening 80 formed in the body of the one-way clutch. A ball 78 is loosely disposed in each opening. A thin flexible split band 79 slidably received in a peripheral groove 81 about the clutch body separates the balls 78 from the rollers 77. Each ball projects in part into a counterbored internal lower area of the clutch body and is seated therein between a pair of opposed coned surfaces of a pair of rings 82, 83. The latter are slidably supported on a reduced portion at 89 of the intermediate spindle 34. The upper coned ring 82 abuts an overhanging shoulder 84 of the clutch body. A spring 85 limited upon a retainer 86 of the clutch body yieldably loads the lower coned ring 83 against the balls, whereby the balls press outwardly upon the split band to expand it against the rollers, thereby constantly holding the rollers 77 pressed against a surrounding wall of a stationary bushing 87. The clutch body is permitted slight endwise play relative to the spindle as determined by the cooperation of the spring retainer 86 with the spacer 71 carried by the spindle. The rollers also are permitted a desirable slight endwise play in their grooves as determined by a retainer stop 88 carried by the bushing.

The operation of the one-way clutch 68 in conjunction with the main clutch 25, 26 to limit the extent of reverse rotation of the driven clutch member 26 and as a consequence reverse rotation of the terminal output spindle 38 during reclutching of the main clutch, is as follows: During the time the main clutch is rotating in a positive or clockwise direction, the body 69 of the one-way clutch is being rotated also in a positive direction by the intermediate spindle 34. In this positive rotation the deeper shoulders 75 of the grooves 74 engage the rollers 77, as best appears in FIG. 10. The depth of the shouldlers 75 is such as to allow the rollers to be rolled by the clutch body over the wall of the surrounding bushing 87. As the resistance of the work increases, the cam rollers 41 of the main clutch move to the points M to deliver maximum torque and then ride over the crests 45 onto the back slopes 46 of the cam lobes. The residual energy of the motor following shut-off of operating air to it is substantially dissipated as the rollers reach the back slopes. The heavy clutch spring 32 then reacts to restore the driven clutch member 26 axially to clutched condition; and at the same time the cam back slopes 46 cooperate with the rollers to rotate the driving clutch member 25 in a positive direction and the driven clutch member 26 in a reverse direction. This counter-rotation of the driven clutch member 26 is transmitted through the intermediate spindle 34 to the body member 69 of the one-way clutch. A short initial reverse rotation of the body 69 rolls the rollers 77 from the position in FIG. 10 into contact with the bottom of the grooves 74 to wedge the rollers against the surrounding bushing 87, as in FIG. 9, whereupon the clutch body and the intermediate spindle, including the driven clutch member 26, are braked against further reverse rotation. The extent of the initial reverse rotation transmitted to the intermediate spindle 34 is governed by the radial clearances 90 between the rollers and the bottoms of the grooves 74, when the rollers are in contact with the surrounding bushing 87 of the one-way clutch. The extent of the reverse rotation is only sufficient to permit the output spindle 38 to unload any torque stored in the spindle due to its torsional deflection under load. This unloaded condition is desirable, as it enables the tool to be readily removed from the work when operation of the tool is finally stopped. The amount of reverse rotation of the output spindle 38, permitted by the one-way clutch is much less than the amount of slack existing between the spindle and the work. Thus the one-way clutch stops the reverse rotation of the output spindle before it can transmit any negative torque to the work. The rollers 41 of the main clutch thereupon roll off the back slopes into the cam troughs. As the point of contact of the rollers 41 change from the negative to the positive slope at the bottom of the troughs the rollers accelerate the output spindle through the slack between it and the work, impacting an energy blow in the tightening direction. By limiting the reverse rotation of the output spindle this energy impact is minimized so that it can be absorbed by the output spindle deflection at a torque value below the desired torque of the work. The cam rollers continue to roll toward the high ends of the cam troughs without reaching the points M and then settle back again at the bottoms of the cam troughs. The tool automatically re-cycles until the operation of the tool is stopped.

What is claimed is:

1. In a rotary nut-running tool including a motor having rotation in a positive direction, and an output spindle; a torque releasable cam clutch comprising a driven part axially slidable relative to and drivingly splined to the spindle, a driving part carried by the motor, a spring yieldably pressing the driven part axially into clutched engagement with the driving part, cam means on the driven part, and camming means on the driving part cooperable with the cam means on the driven part to cam the latter axially against the resistance of the spring out of engagement upon the driving part realizing a predetermined torque load, wherein the spring is adapted following such disengagement to return the driven part axially into re-engagement and wherein the cam means of the driven part is cooperable with the camming means of the driving part to cause relative reverse rotation of the driven part and as a consequence reverse rotation of the spindle during the time the driven part moves axially to re-engagement; and braking means having automatic response to a predetermined limited degree of such reverse rotation to brake the spindle against further rotation while permitting the driven part to return axially to re-engagement.

2. In a rotary nut-running tool as in claim 1, wherein the cam means of the driven member includes a group of circumferentially spaced lobes each having a rounded crest, a short forward slope, and a long back slope; a trough separating each lobe from the other, each trough having a high end merging at a point of tangency with an adjacent short forward slope and having a low end merging into a long back slope; and the camming means of the driving part comprising a group of circumferentially spaced rollers, each normally engaged in a trough of the driven part, the rollers being adapted upon the driving part experiencing overload to be carried out of the troughs up the short slopes and over the crests onto the back slopes, and said disengagement occurring upon the rollers riding over the crests.

3. In a rotary nut-running tool as in claim 1, wherein a work socket attached to the spindle has a slack driving connection with the work, and the said predetermined limited degree of such reverse rotation is less than the extent of the slack in said connection.

4. In a rotary nut-running tool as in claim 1, wherein the braking means comprises an annular body having rotation as a unit with the spindle, a stationary wall closely surrounding the body, roller means in the periphery of the body, yieldable means pressing the roller means lightly against the surrounding wall, the roller means having a first position wherein it is rotatable over the surrounding wall with the body in a positive direction, and having a second position spaced circumferentially from the first wherein it is wedged between the body and the surrounding wall braking the body and as a consequence the spindle against reverse rotation, and cam means in the body responsive to rotation of the spindle for bringing the roller means to its first or second position accordingly as the spindle is rotated in a positive or reverse direction.

5. In a rotary nut-running tool including a motor, and an output spindle; a torque releasable cam clutch comprising a driven part axially slidable relative to and drivingly splined to the spindle, a driving part carried by the motor, a spring urging the driven part axially into clutched engagement with the driving part, cam means on the driven part, and camming means on the driving part cooperable with the cam means on the driven part to cam the latter axially out of engagement upon the driving part realizing a predetermined torque load, wherein the spring is adapted following such disengagement to return the driven part axially into re-engagement and wherein the cam means of the driven part is cooperable with the camming means of the driving part to cause relative reverse rotation of the driven part and as a consequence reverse rotation of the spindle as the driven part moves axially to re-engagement; and braking means having response to a predetermined limited degree of such reverse rotation to brake the spindle against further rotation while permitting the driven part to return axially to re-engagement; wherein the braking means comprises an annular body having rotation as a unit with the spindle, a stationary wall closely surrounding the body, grooves in the periphery of the body each having a pair of opposed arcuate circumferentially spaced shoulders, a first one of the shoulders facing in a positive direction having a greater radial depth than a second one of the shoulders facing in a reverse direction, a bottom wall in each groove inclining from the first shoulder to the second, a roller in each groove, yieldable means pressing each roller lightly against the surrounding wall, each roller obtaining upon rotation of the body in a positive direction a position abutting the positively facing shoulder wherein it is rotatable over the surrounding wall as the body rotates in a positive direction, and each roller obtaining upon subsequent rotation of the body in a reverse direction to a predetermined degree between the shoulders a position wherein the roller is wedged between the bottom wall of the groove and the surrounding wall restraining the body and as a consequence the spindle against further reverse rotation.

6. In a nut running tool as in claim 5, wherein there is a radial clearance between each roller and the bottom wall of its groove, and the predetermined degree of said reverse rotation is governed by the extent of such clearance.

7. In a rotary nut-running tool as in claim 5, wherein the yieldable means pressing each roller lightly against the surounding wall comprises a group of radial holes in the body each opening into a separate one of the grooves, a loose ball in each hole, a split expansible band common to all of the holes disposed closely between the balls and the rollers, and spring means constantly transmitting a component of force through the balls to expand the band so as to press the rollers against the surrounding wall.

8. In a rotary nut-running tool comprising a motor, an output spindle, a work socket carried by the spindle having a slack driving connection with the work, a torque releasable cam clutch drivingly connecting the motor to the spindle having a motor connected driving part and a spring loaded driven part movable axially relative to the spindle out of clutched engagement from the driving part against the spring load upon the driving part experiencing a predetermined torque and being axially returnable by the spring load to clutched engagement subsequent to disengagement, and interconnectable cam means between the clutch parts having cooperation with one another during the return movement of the driven part to impart reverse rotation to the latter and as a consequence to the spindle and work socket tending to loosen the work; braking means responsive to a predetermined degree of said reverse rotation to restrain the spindle and as a consequence the driven part against further reverse rotation, said degree of reverse rotation not exceeding the degree of slack existing in said connection between the socket and the work.

9. In a rotary nut-running tool as in claim 8, including power control means responsive to disengaging action of the driven part to shut off power to the motor, and time delay means responsive to re-engaging action of the driven part to resume the power to the motor after a predetermined delay following re-engagement.

References Cited

UNITED STATES PATENTS

| | | | |
|---|---|---|---|
| 2,925,157 | 2/1960 | Davis | 192—8 |
| 3,174,559 | 3/1965 | Vaughn | 173—93.5 X |
| 3,275,116 | 9/1966 | Martin | 173—12 X |
| 3,298,481 | 1/1967 | Schaedler et al. | 173—12 X |

FOREIGN PATENTS

| | | |
|---|---|---|
| 888,934 | 12/1943 | France. |
| 731,443 | 2/1943 | Germany. |

JAMES L. JONES, JR., *Primary Examiner.*